(12) United States Patent
Haartsen

(10) Patent No.: US 7,813,695 B2
(45) Date of Patent: Oct. 12, 2010

(54) MOBILE ASSISTED RELAY SELECTION IN A TELECOMMUNICATIONS SYSTEM

(75) Inventor: Jacobus C. Haartsen, Hardenberg (NL)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 1469 days.

(21) Appl. No.: 11/123,046

(22) Filed: May 6, 2005

(65) Prior Publication Data

US 2006/0252367 A1 Nov. 9, 2006

(51) Int. Cl.
| H04B 7/15 | (2006.01) |
| H04B 1/00 | (2006.01) |
| H04B 1/04 | (2006.01) |
| H01Q 11/12 | (2006.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H03D 3/24 | (2006.01) |

(52) U.S. Cl. ............ 455/11.1; 455/63.1; 455/126; 455/127.1; 370/229; 370/318; 375/260; 709/232

(58) Field of Classification Search ............ 455/7, 455/11.1, 16, 18, 446, 452.1, 445, 456.1, 455/410, 465, 8, 9, 10, 13.1–13.4, 63.1, 67.11–67.14, 455/125, 126, 127.1, 127.2, 455, 449, 509, 455/511, 513, 515, 522, 526, 518, 519, 562.1; 370/226, 243, 246, 274, 279, 293, 315, 316, 370/492, 501, 252, 318.338, 342.347, 229, 370/235, 318, 328, 329, 331–338, 342, 347, 370/348, 395.4, 441, 468; 342/174, 357.06, 342/387, 442, 457, 465; 375/360; 709/232

See application file for complete search history.

(56) References Cited

U.S. PATENT DOCUMENTS

| 4,578,815 A | 3/1986 | Persinotti |
| 5,612,948 A | 3/1997 | Fette et al. |
| 5,633,876 A * | 5/1997 | Dinkins .................. 370/315 |
| 5,883,884 A * | 3/1999 | Atkinson ................. 370/279 |
| 5,943,323 A | 8/1999 | Olanders et al. |
| 6,101,171 A * | 8/2000 | Yoshida et al. ........... 370/280 |

(Continued)

FOREIGN PATENT DOCUMENTS

| CA | 2455586 A1 | 12/2003 |
| EP | 0876006 A2 | 11/1998 |
| EP | 0876006 A3 | 1/2000 |
| EP | 1 126 636 A | 8/2001 |
| WO | WO 01/48946 A1 | 7/2001 |
| WO | WO 02/25979 A1 | 3/2002 |
| WO | WO 2005/025110 A | 3/2005 |

OTHER PUBLICATIONS

PCT International Search Report, dated Aug. 1, 2006, in connection with International Application No. PCT/EP2006/062069.

(Continued)

*Primary Examiner*—Andrew Wendell
*Assistant Examiner*—Paul P Tran
(74) *Attorney, Agent, or Firm*—Potomac Patent Group PLLC

(57) ABSTRACT

A mobile station is operated in a telecommunications system that includes a base station and one or more relay stations. The mobile station communicates directly with the base station via a first channel. To facilitate selection of a suitable relay station, the mobile station broadcasts a burst for receipt by a plurality of relay stations. Relay stations each measure a quality of the received burst and communicate this information to the base station, which uses the information to select a most suitable one of the relay stations for use in carrying on indirect communications between the base station and the mobile station.

20 Claims, 3 Drawing Sheets

U.S. PATENT DOCUMENTS

| | | | |
|---|---|---|---|
| 6,132,306 | A | 10/2000 | Trompower |
| 6,373,833 | B1 * | 4/2002 | Suonvieri et al. ........... 370/347 |
| 6,424,818 | B1 | 7/2002 | Hirono |
| 6,832,091 | B1 | 12/2004 | Sugaya |
| 6,954,612 | B2 * | 10/2005 | Cheng et al. ............... 455/11.1 |
| 7,295,544 | B2 * | 11/2007 | Allen et al. ................. 370/338 |
| 7,400,856 | B2 * | 7/2008 | Sartori et al. .................. 455/7 |
| 2001/0031624 | A1 | 10/2001 | Schmutz |
| 2002/0136179 | A1 | 9/2002 | Aoyama et al. |
| 2004/0157551 | A1 | 8/2004 | Gainey et al. |
| 2004/0218533 | A1 * | 11/2004 | Kim et al. ................... 370/235 |
| 2004/0224631 | A1 | 11/2004 | Davis et al. |
| 2007/0160014 | A1 * | 7/2007 | Larsson ...................... 370/338 |

OTHER PUBLICATIONS

PCT Written Opinion, dated Aug. 1, 2006, in connection with International Application No. PCT/EP2006/062069.

Pabst, R. et al., "Relay-based deployment concepts for wireless and mobile broadband radio," IEEE Comm. Magazine, vol. 42, No. 9, pp. 80-89, 2004.

Sreng. V. et al., "Relayer selection strategies in cellular networks with peer-to-peer relaying," IEEE VTC Fall '03, Orlando, FL, Oct. 2003.

"Multihop Diversity in Wireless Relaying Channels," IEEE Transactions on Communications, vol. 52, Issue 9, p. 1605, Sep. 2004, ISSN: 0090-6778 (abstract).

Zadeh, A.N. et al., "Throughput of a multihop packet CDMA network with power control," vol. 1, pp. 31-35, 2000 IEEE 51$^{st}$ Vehicular Technology Conference Proceedings, Tokoyo, Japan, May 15-18, 2000, IEEE, Piscataway, NJ, USA, ISBN 0870357183 (INSPEC Abstract No. B2000-09-6250F-081).

Tameh, E.K. et al., "The use of intelligently deployed fixed relays to improve the performance of a UTRA-TDD system," vol. 3, pp. 1890-1894, 2003 IEEE 58$^{th}$ Vehicular Technology Conference, Orlando, FL, Oct. 6-9, 2003, IEEE, Piscataway, NJ, USA, ISBN: 0780379543 (INSPEC Abstract No. B2004-10-6250E-289).

Lin, P. et al., "Modeling opportunity driver multiple access in UMTS," vol. 3, No. 5, pp. 1669-1677 *IEEE Transactions on Wireless Communications*, IEEE, Sep. 2004, USA, ISSN: 1536-1276 (INSPEC Abstract No. B2004-12-6250E-137).

Kwon, Y.H. et al., "On the performance of uplink packet relay protocols for CDMA cellular-like systems," pp. 639-645, 2003 International Conference on Wireless Networks, Las Vegas, NV, USA, Jun. 23-26, 2003, CSREA Press, USA, ISBN: 1932415033 (INSPEC Abstract No. B2004-10-6250F-619).

Harrold, T.J. et al., "Performance analysis of intelligent relaying in UTRA TDD," vol. 3, pp. 1374-1378, 2002 IEEE 56$^{th}$ Vehicular Technology Conference Proceedings, Vancouver, BC, Canada, Sep. 24-28, 2002, IEEE, Piscataway, NJ, USA, ISBN: 0780374673 (INSPEC Abstract No. B2003-04-6250F-422).

* cited by examiner

MOBILE ASSISTED RELAY SELECTION IN A TELECOMMUNICATIONS SYSTEM

BACKGROUND

The invention relates to mobile telecommunication systems, more particularly to mobile telecommunication systems in which mobile terminals communicate with fixed base stations by means of relay stations, and even more particularly to selection of a most suitable one of a number of relay stations for use in communications between a mobile terminal and a base station. Other aspects relate to architectures for mobile telecommunication systems that employ base stations and relay stations.

Cellular communication systems evolving from third-generation (3G) and fourth-generation (4G) systems may provide data rates well exceeding 25 Mb/s, perhaps even exceeding 100 Mb/s. For a receiver in such a system to be able to operate at an acceptable error rate, a minimum signal to noise ratio (SNR) per bit (Eb/N0) is required. What the minimum Eb/N0 is depends on the modulation and coding schemes used and is on the order of 5 dB for coded Quadrature Phase Shift Keying (QPSK) systems, but can be as high as 25 dB for complex modulation schemes like 64-Quadrature Amplitude Modulation (64-QAM). The energy per bit, Eb, is proportional to the received power $P_{rx}$, and inversely proportional to the data rate R in accordance with:

$$Eb = P_{rx} - R \text{ dB Joule}$$

The received power $P_{rx}$ is related to the transmit power $P_{tx}$, the antenna gain G, and the propagation loss PL caused by distance and other radio propagation effects in accordance with:

$$P_{rx} = P_{tx} + G - PL \text{ dB Joule}$$

The higher the data rate R, the more the received power $P_{rx}$ has to increase to keep the energy received per bit Eb at an acceptable minimum level to ensure an acceptable bit error rate (BER). Since the output power $P_{tx}$ of the transmitters is limited (especially in mobile stations due to battery limitations and limited heat-sink capabilities), the increased received power must be achieved by increasing the gain or decreasing the path loss. The gain can be increased using directional antennas. Smart, adaptive antennas are required since the mobile station's position changes with respect to the base station. Alternatively, or in addition, extra base stations are deployed to reduce the distance between the mobile terminal and the nearest base station.

Cell splitting is a known method for decreasing the distance between the base station (BS) and the mobile station (MS). The idea with cell splitting is to have more than one cell site serve a particular geographical area. Each cell site can thereby cover a smaller area, and accordingly use lower power levels which in turn creates the opportunity to reuse frequencies more times within a given system. Until now, geographical area operators have applied cell splitting to increase capacity in their systems. In the next generation cellular systems, cell splitting will be applied to reduce the mobile station-base station distance.

Cell splitting is costly for the system operators. It requires additional base station equipment as well as real estate at which to place the base stations. Therefore, the use of relay stations (RSs) is being considered as a substitute for the additional base station equipment. Instead of a fully functional base station, the relay station merely receives and forwards the signals between the base station and the mobile station. FIG. 1 illustrates an exemplary arrangement comprising a cell 125 having a base station 120, a mobile station 140, and several relay stations 130, ..., 135. Since the relative positions of the relay stations with respect to the base station are fixed, simple directional antennas can be used between the base station 120 and each of the relay stations 130, ..., 135. Each of the relay stations 130, ..., 135 and base station 120 can therefore communicate with very high data rates without the need for excessive transmit power. Because the distance between the mobile station 140 and the nearest one of the relay stations 130, ..., 135 is limited, high data rate communication can be supported between the mobile station 140 and the relay station 130, ..., 135 without the use of excessive transmit power. More background on cellular systems with relay stations can be found in R. Pabst et al., "Relay-based deployment concepts for wireless and mobile broadband radio," IEEE Comm. Magazine, vol. 42, no. 9, pp. 80-89, 2004. By using directional antennas for the (relatively) long path between the base station 120 and each of the relay stations 130, ..., 135 and using omni-directional antennas for the (relatively) short path between the relay station 130, ..., 135 and the mobile station 140, capacity and throughput per user is increased as mutual interference between base stations and relay stations is minimized.

The selection of a relay station has been studied in the past. See, for example, V. Sreng et al., "Relayer selection strategies in cellular networks with peer-to-peer relaying," IEEE VTC Fall '03, Orlando, Fla., October 2003. Selection criteria can be the distance, the propagation path, carrier to noise ratio (C/N) or carrier to interference ratio (C/I), or a combination of any of these. However, in order to carry out the selection process, a network feature has to be implemented including measurement procedures for supporting the selection process.

In a conventional cellular network, the base stations broadcast a control channel (BCCH) or beacon channel. The mobile station can use this BCCH to obtain information necessary to synchronize itself to the network, to register to the system, and to make and accept calls. The received signal strength indicator (RSSI) and the quality of the BCCH can be used as parameters in the base station selection procedure. For proper selection of the relay station, the relay station could broadcast a BCCH as well. However, this would unnecessarily load the system and use scarce spectrum resources wastefully. Although required only for call setup and handover support, which are relatively infrequent events, the BCCH would be transmitted continuously by the relay stations.

In addition, BCCH channel planning (frequency or code allocation) for the relay stations would be an operator's nightmare.

Accordingly, it is desirable to provide an alternative mechanism for suitably selecting one from a number of relay stations to be used as a conduit for communications between mobile stations and base stations.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for variously operating mobile stations, relay stations, and base stations in a telecommunications system. In accordance with one aspect, a method of operating a mobile station comprises communicating directly with a base station via a first channel; broadcasting a burst for receipt by a plurality of relay stations; establishing a connection with one of the plurality of relay stations; and communicating indirectly with the base station via a second channel established with said one of the plurality of relay stations.

In some embodiments, communication via the first channel proceeds at a first rate; communication via the second channel proceeds at a second rate; and the second rate is higher than the first rate.

In another aspect, prior to broadcasting the burst for receipt by the plurality of relay stations, the mobile station requests a higher rate connection from the base station. The base station can respond by providing instructions to the mobile station, wherein the instructions instruct the mobile station to broadcast the burst for receipt by the plurality of relay stations.

The burst can be transmitted on a channel that is dedicated to transmissions of bursts for receipt by the plurality of relay stations. Alternatively, the burst can be transmitted during a fixed time slot that is dedicated to transmissions of bursts for receipt by the plurality of relay stations.

In yet another aspect, the first channel can be maintained concurrently with the second channel, and the first channel used to communicate control information directly with the base station. In some embodiments, the first channel is used to communicate all control signaling between the mobile station and the base station; and the second channel is used to communicate only user traffic between the mobile station and the base station. Alternatively, the first channel can be used to communicate only control signaling related to mobility and connection establishment/release between the mobile station and the base station; and the second channel can be used to communicate user traffic and control signaling associated with the user traffic between the mobile station and the base station.

In other aspects, operation of a relay station in a telecommunications system comprises scanning for a burst that was broadcast by a mobile station; receiving the burst; measuring one or more characteristics of the received burst that are indicative of a quality of reception; and using a direct link with a base station in the telecommunications system to communicate information indicative of the quality of reception.

In another aspect relating to operation of a relay station, after communicating information indicative of the quality of reception to the base station, the relay station receives instructions from the base station, wherein the instructions instruct the relay station to establish a direct connection with the mobile station, wherein the relay station uses the direct connection with the mobile station to relay communications exchanged between the mobile station and the base station.

Scanning for the burst can comprise, for example, scanning continuously on a random access channel for bursts from the mobile station. Alternatively, scanning for the burst can comprise receiving one or more instructions from the base station, and in response to the one or more instructions, scanning on a random access channel for bursts from the mobile station.

In other aspects, operation of a base station in a mobile telecommunication system comprises communicating directly with a mobile station via a first channel; receiving a request for a higher rate connection from the mobile station; instructing the mobile station to broadcast a burst for receipt by a plurality of relay stations; receiving, from each of one or more relay stations, information indicative of a quality of reception of the burst from the mobile station; using the information from each of the one or more relay stations as a basis for selecting one of the one or more relay stations; and communicating indirectly with the mobile station via the selected relay station.

In another aspect, before communicating indirectly with the mobile station via the selected relay station, the base station instructs the selected relay station to establish a direct connection with the mobile station.

In still another aspect, in response to receiving the request for the higher rate connection from the mobile station, the base station instructs one or more relay stations to scan for a burst to be broadcast by the mobile station.

The one or more relay stations can be, for example, all of the relay stations with which the base station can communicate. Alternatively, the one or more relay stations can be selected from all of the relay stations with which the base station can communicate based on relay station location relative to a location of the mobile station.

In still another aspect relating to operation of a base station, a base station communicates indirectly with a mobile station via a first relay station; instructs the mobile station to broadcast a burst for receipt by a plurality of relay stations; receives, from each of one or more relay stations, information indicative of a quality of reception of the burst from the mobile station; and uses the information from each of the one or more relay stations as a basis for selecting one of the one or more relay stations. If the selected relay station is not the first relay station, the base station provides the mobile station with instructions that will cause the mobile station to communicate indirectly with the base station via the selected relay station.

In yet another aspect, the instructions that will cause the mobile station to communicate indirectly with the base station via the selected relay station identify a physical channel to be used by the mobile station.

BRIEF DESCRIPTION OF THE DRAWINGS

The objects and advantages of the invention will be understood by reading the following detailed description in conjunction with the drawings in which.

DETAILED DESCRIPTION

Figure 1:
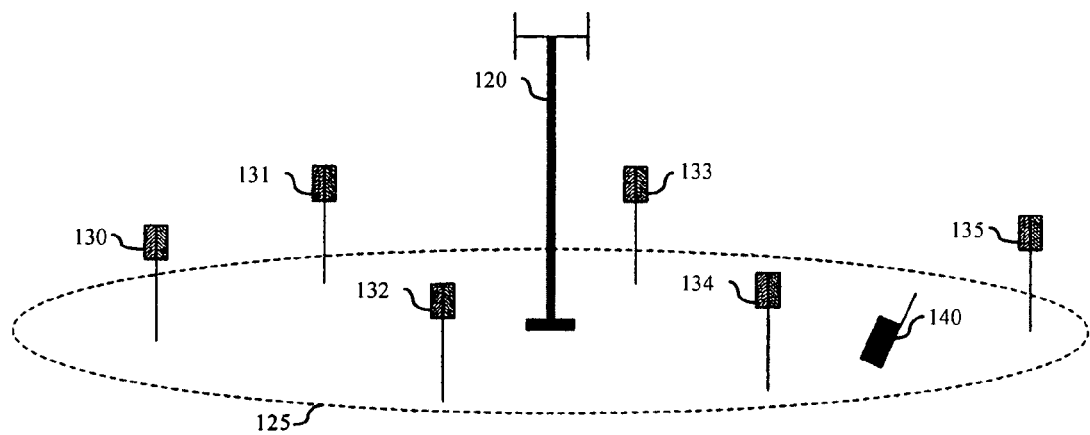
FIG. 1 illustrates an exemplary arrangement in a mobile telecommunications system comprising a cell 125 with a base station 120, a mobile station 140, and several relay stations 130, . . . , 135.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

Figure 2:
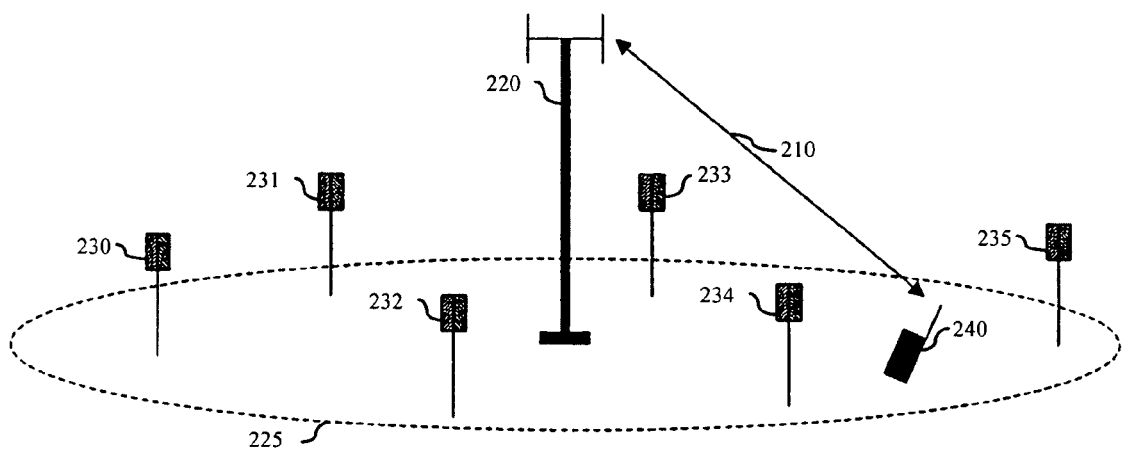
FIG. 2 is a diagram of a mobile station operating in a cell that includes a base station and a number of relay stations.

In one aspect, a method is presented in which the mobile station plays a pivotal role in the relay station selection procedure. A mobile station 240 operating in accordance with the invention is depicted in FIG. 2. The system in which the mobile station 240 operates comprises a base station 220, and several relay stations 230, . . . , 235. Preferably, the mobile station 240 is locked onto the BCCH 210 of the base station 220 as schematically illustrated in FIG. 2. The base station 220 creates a macro-cell 225 in which the relay stations 230, . . . , 235 are placed. It should be noted that the base station 220 itself could be a mini-base station or pico-base station in the overall hierarchy of the cellular system. The relay stations 230-235 are locked onto the base station 220 via a packet-switched connection, for example GPRS.

Using a conventional cellular protocol like GSM, GPRS, or WCDMA, the mobile station 240 may request a high data rate channel (e.g., HSDPA in enhanced 3G systems). As mentioned in the Background section above, communication at this high data rate will require a higher minimum received power $P_{rx}$ in order to maintain acceptable BER rates. Accordingly, in order to effectively reduce the distance between transmitting and receiving antennas for this service, the network will use a relay station.

Figure 3:
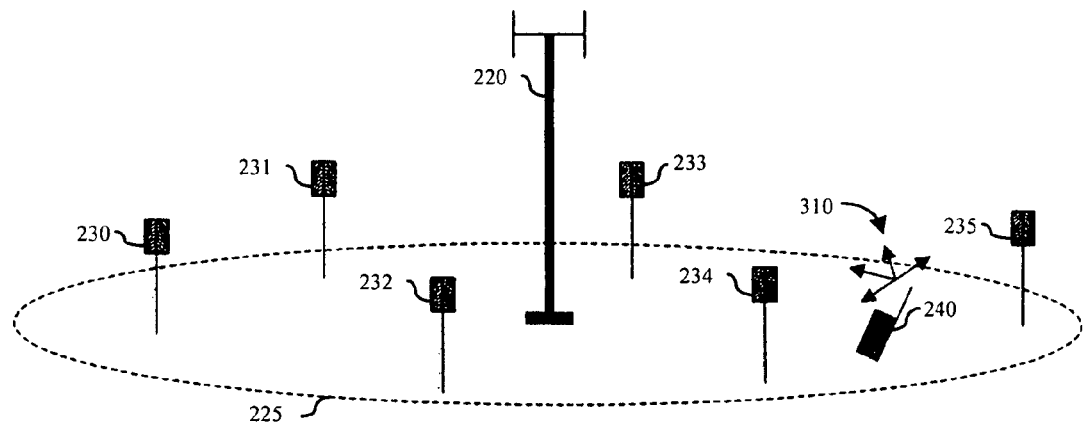
FIG. 3 is a diagram of a mobile station transmitting random access packets in accordance with an aspect of the invention.

Selecting which of the relay stations 230-235 to use for the high data rate channel will be based on some predetermined criterion or criteria. However, instead of the network sending broadcast control signals to allow the mobile station to perform a measurement, the inverse technique is applied. Referring to FIG. 3, the mobile station 240 broadcasts a random access (RA) packet 310. It is intended that some number of the surrounding relay stations 230, . . . , 235 will receive the RA packet and analyze the quality. The relay stations 230, . . . , 235 must therefore scan the random access channel. This may be performed continuously by the relay stations 230, . . . , 235. The random access channel can be defined in any of a number of ways, the particular way selected not being an essential aspect of the invention. For example, the random access channel can be characterized by a dedicated frequency in a frequency division multiple access (FDMA) system. Alternatively, the random access channel can be characterized as one or more dedicated time slots in a time division multiple access (TDMA) system. In yet another alternative, the random access channel can be characterized by a dedicated spreading code in a spread spectrum system. Yet other alternatives can be derived by, for example, combining any of these described channel access techniques. When dedicated time slots are used, the relay stations need to be time aligned with the base station 220, but this is no problem because the relay stations 230, . . . , 235 are already locked onto the BS 220, as described above.

Alternatively, the scanning by the relay stations 230, . . . , 235 can be done on demand: the base station 220 knows when the mobile station 240 will issue a random access packet 310 and can therefore instruct the relay stations 230, . . . , 235 to scan the random access channel during a limited time window. For example, the base station 220 can instruct all relay stations 230, . . . , 235 to perform a scan when it has no location information about the mobile station 240. Alternatively, if the base station 220 has information about the location of the mobile station 240, it can instruct only those ones of the relay stations 230, . . . , 235 that are in the neighborhood of the mobile station 240 to perform a scan. For example, in FIG. 3, the base station 220 may have angular information which informs that the mobile station 240 is in the right half plane of the cell 225. The base station 220 could then instruct only the relay stations 233, 234 and 235 to scan the random access channel.

Each relay station that receives the random access burst 310 responds by determining the quality of the reception and forwarding this information to the base station 220. The quality information may include, for example, a signal strength level, a BER indication, soft information, or other signal features. In addition, the information may include a time stamp and an identification number (e.g., a random identification number) that could be included in the random access packet.

Figure 4:
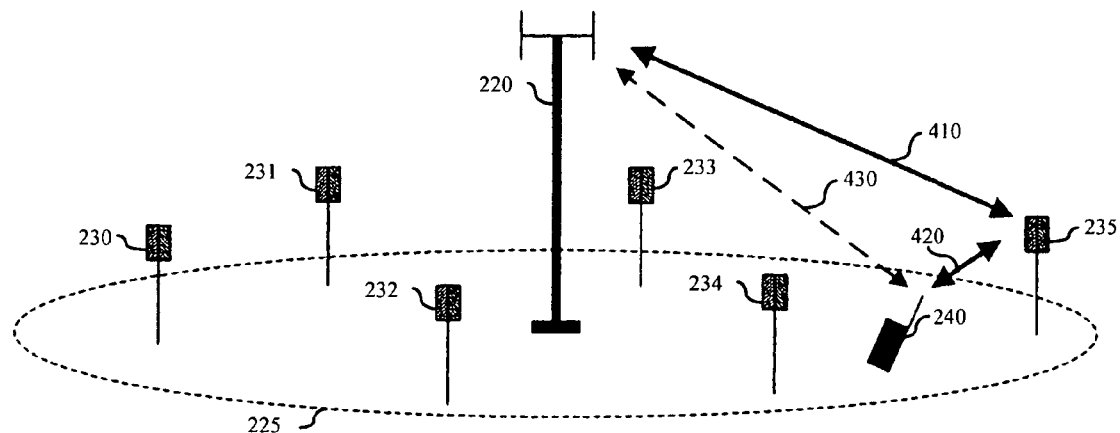
FIG. 4 is a diagram of two high rate connections being established—a first connection between a base station and a relay station, and a second connection between a relay station and a mobile station.

Based on the information gathered from different relay stations, the base station 220 decides which of the relay stations 230, . . . , 235 is optimal to connect the mobile station 240 to. In FIG. 4, it is assumed that the signal quality was best for relay station 235. The base station 220 then establishes a first high-rate connection 410 to the relay station 235 (preferably via directional antennas) and a second high-rate channel 420 is established between the relay station 235 and the mobile station 240. Establishment of the second high-rate channel 420 can be performed under the direction of the base station 220. Alternatively, it can be locally arranged by suitable signaling between the relay station 235 and the mobile station 240.

In another aspect, the procedure as described above can also be carried out during handover. During the high-rate connection (or during a pause in the high-rate communications), the random-access packet 310 is sent by the mobile station 240 and is picked up by surrounding one of the relay stations 230, . . . , 235. The base station 220 may then instruct the current relay station to handover the connection to another relay station. The instructions may, for example, identify a physical channel (e.g., characterized by frequency, time slot, and/or spreading code, depending on the type of system in use) to be used by the mobile station.

Preferably, the mobile station 240 remains in communication with the base station 220 for control signaling. That is, while exchanging user information with the base station 220 indirectly via the relay station using the second channel 420, the mobile station 240 remains locked to the base station 220 via the first channel 430. In one embodiment, all control signaling may be carried over the first channel 430. In an alternative embodiment, only control signaling related to mobility and connection establishment/release may be carried by the first channel 430, whereas control signaling associated with the user traffic is relayed via the relay station over the second channel 420.

The mobile station 240 remains locked to the core network of the mobile system via the first channel 430. This facilitates handovers not only between relay stations belonging to the current base station 220, but also between relay stations belonging to different base stations. In addition, when the second channel 420 is released, the mobile station 240 remains locked to the mobile system and does not have to carry out a connection setup and/or registration procedure.

Figure 5:
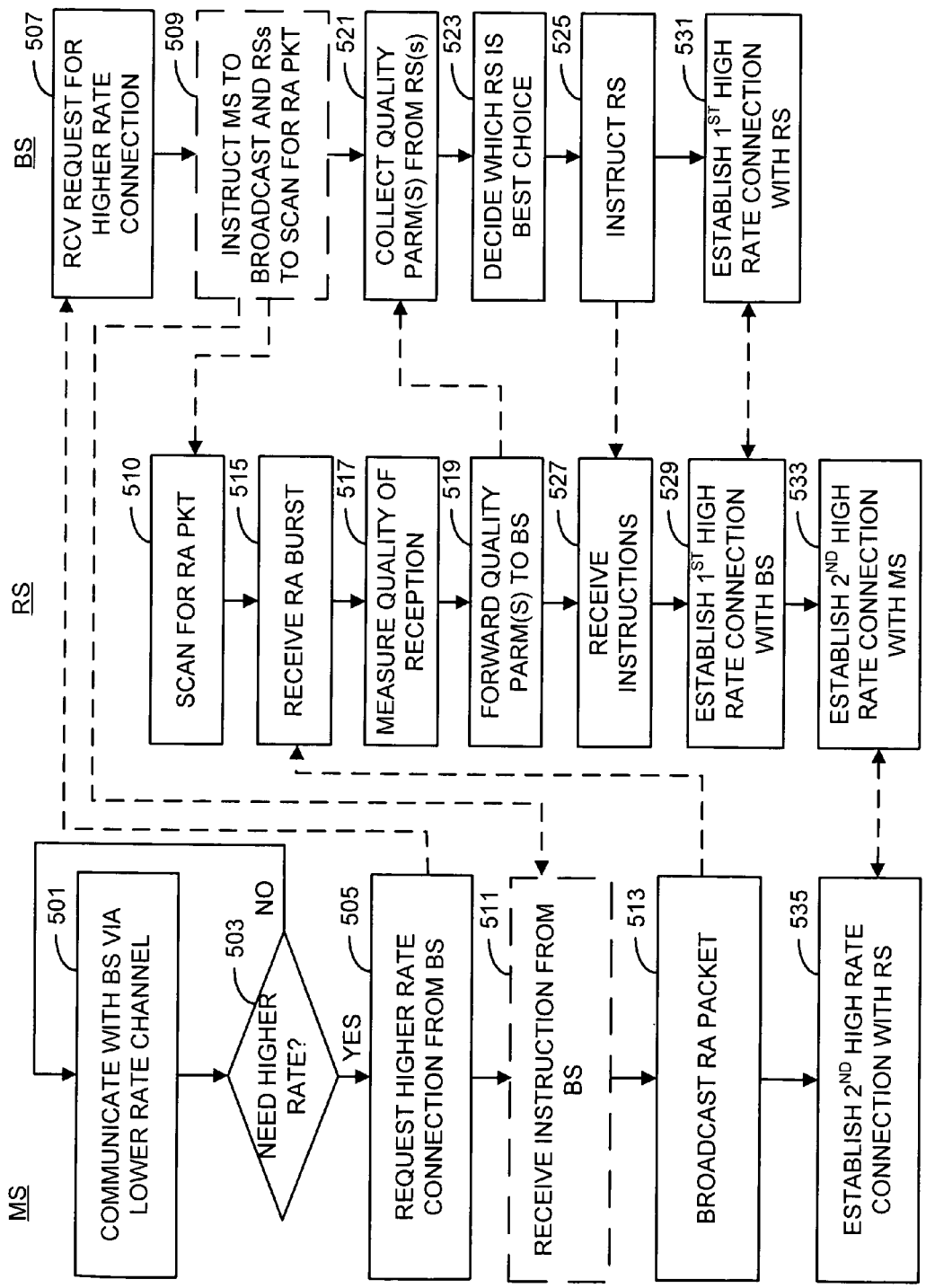
FIG. 5 is a flow diagram illustrating steps carried out in accordance with an exemplary embodiment.

FIG. 5 is a flow diagram illustrating steps carried out in accordance with one of many possible exemplary embodiments. In the figure, steps carried out by a mobile station are aligned under the heading "MS"; steps carried out by a relay station are aligned under the heading "RS"; and steps carried out by a base station are aligned under the heading "BS". Also, boxes depicted in dashed lines indicate steps/actions that may not be present in all embodiments. (The boxes depicted in dashed lines are to be distinguished from the dashed lines that are intended to indicate links between actions taken by the various entities at the terminal points of the dashed lines.)

To begin this example, it is assumed that a mobile station is communicating with the base station by means of a lower rate channel (step 501). The mobile station checks to determine whether a higher rate channel is needed (decision block 503). If not ("NO" path out of decision block 503), then processing returns to communication via the lower rate channel at step 501.

If a higher rate channel is needed ("YES" path out of decision block 503), then the mobile station requests a higher rate connection from the base station (step 505). The base station receives this request (step 507) and instructs the mobile station to broadcast a random access packet on the random access channel, and also instructs the relay stations (e.g., all relay stations, or alternatively only those relay stations known to be in the vicinity of the mobile station) to scan for the random access packet to be broadcast by the mobile station (step 509).

In response to the base station's instructions, each relay station scans for a random access packet (step 510). The mobile station also receives the base station's instructions (step 511). When the mobile station broadcasts its random access packet (step 513), it is received by one or more relay stations (step 515). A relay station that receives a random access burst from a mobile station performs one or more measurements to determine the quality of reception (step 517). Information about the quality of reception is then forwarded by the relay station to the base station (step 519).

The base station collects the reception quality information from the one or more relay stations that supply it (step 521). Based on this collected data, the base station decides which relay station would be the best choice for use by the mobile station (step 523). The base station then selects this relay station for use by the mobile station and instructs that relay station to establish the necessary high rate connections (step 525).

The selected relay station receives the instructions (step 527) and responds by establishing a first high rate connection with the base station (step 529). This may involve some signaling between the selected relay station and the base station (step 531).

The selected relay station also exchanges the necessary signals with the mobile station to establish a second high rate connection between the relay station and the mobile station (steps 533 and 535). The signals may, for example, identify a physical channel (e.g., characterized by frequency, time slot, and/or spreading code, depending on the type of system in use) to be used by the mobile station.

Having established the first and second higher rate connections, the mobile station may then communicate with the base station by means of a higher rate channel via the relay station.

The various aspects of the invention provide a number of advantages. For example, the signaling load associated with selection of a relay station is reduced compared to conventional techniques. Also, relay stations do not have to be involved in the broadcast scheme of the cellular network. A further advantage is that the quality of reception in the relay stations is determined rather than in the mobile stations. Since the relay stations tend to be placed at strategic positions with regard to coverage, they are more exposed to interference. Therefore, the selection of the uplink channel is more critical. A selection based on measurements in the relay stations will therefore produce a more robust connection.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a base station in a mobile telecommunications system, the method comprising:
the base station communicating directly with a mobile station via a first channel;
the base station receiving a request for a higher rate connection from the mobile station;
the base station instructing the mobile station to broadcast a random access burst for receipt by a plurality of relay stations;
the base station receiving, from each of one or more relay stations, information indicative of a quality of reception of the random access burst from the mobile station;
the base station using the information from each of the one or more relay stations as a basis for selecting one of the one or more relay stations; and
the base station communicating indirectly with the mobile station via the selected relay station.

2. The method of claim 1, comprising:
before communicating indirectly with the mobile station via the selected relay station, instructing the selected relay station to establish a direct connection with the mobile station.

3. The method of claim 1, comprising:
in response to receiving the request for the higher rate connection from the mobile station, instructing one or more relay stations to scan for a random access burst to be broadcast by the mobile station.

4. The method of claim 3, wherein the one or more relay stations are all of the relay stations with which the base station can communicate.

5. The method of claim 3, wherein the one or more relay stations are selected from all of the relay stations with which the base station can communicate based on relay station location relative to a location of the mobile station.

6. The method of claim 1, comprising:
maintaining the first channel concurrently with communicating indirectly with the mobile station via the selected relay station; and
using the first channel to communicate control information directly with the mobile station.

7. The method of claim 6, wherein:
the first channel is used to communicate all control signaling between the mobile station and the base station; and
only user traffic is communicated indirectly between the mobile station and the base station.

8. The method of claim 6, wherein:
the first channel is used to communicate only control signaling related to mobility and connection establishment/release between the mobile station and the base station; and
user traffic and control signaling associated with the user traffic is communicated indirectly between the mobile station and the base station.

9. A method of operating a base station in a mobile telecommunications system, the method comprising:
the base station communicating indirectly with a mobile station via a first relay station;
the base station instructing the mobile station to broadcast a random access burst for receipt by a plurality of relay stations;
the base station receiving, from each of one or more relay stations, information indicative of a quality of reception of the random access burst from the mobile station;
the base station using the information from each of the one or more relay stations as a basis for selecting one of the one or more relay stations; and
if the selected relay station is not the first relay station, then the base station providing the mobile station with instructions that will cause the mobile station to communicate indirectly with the base station via the selected relay station.

10. The method of claim 9, wherein the instructions that will cause the mobile station to communicate indirectly with the base station via the selected relay station identify a physical channel to be used by the mobile station.

11. An apparatus for operating a base station in a mobile telecommunications system, the apparatus comprising:
means for communicating directly with a mobile station via a first channel;
means for receiving a request for a higher rate connection from the mobile station;
means for instructing the mobile station to broadcast a random access burst for receipt by a plurality of relay stations;
means for receiving, from each of one or more relay stations, information indicative of a quality of reception of the random access burst from the mobile station;
means for using, the information from each of the one or more relay stations as a basis for selecting one of the one or more relay stations; and
means for communicating indirectly with the mobile station via the selected relay station.

12. The apparatus of claim 11, comprising:
means for, before communicating indirectly with the mobile station via the selected relay station, instructing the selected relay station to establish a direct connection with the mobile station.

13. The apparatus of claim 11, comprising:
means for, in response to receiving the request for the higher rate connection from the mobile station, instructing one or more relay stations to scan for a random access burst to be broadcast by the mobile station.

14. The apparatus of claim 13, wherein the one or more relay stations are all of the relay stations with which the base station can communicate.

15. The apparatus of claim 13, wherein the one or more relay stations are selected from all of the relay stations with which the base station can communicate based on relay station location relative to a location of the mobile station.

16. The apparatus of claim 11, comprising:
means for maintaining the first channel concurrently with communicating indirectly with the mobile station via the selected relay station; and
means for using the first channel to communicate control information directly with the mobile station.

17. The apparatus of claim 16, wherein:
the means for using the first channel to communicate control information directly with the mobile station uses the first channel to communicate all control signaling between the mobile station and the base station; and
the means for communicating indirectly with the mobile station via the selected relay station communicates only user traffic indirectly between the mobile station and the base station.

18. The apparatus of claim 16, wherein:
the means for using the first channel to communicate control information directly with the mobile station uses the first channel to communicate only control signaling related to mobility and connection establishment/release between the mobile station and the base station; and
the means for communicating indirectly with the mobile station via the selected relay station communicates only user traffic and control signaling associated with the user traffic indirectly between the mobile station and the base station.

19. An apparatus for operating a base station in a mobile telecommunications system, the apparatus comprising:
means for communicating indirectly with a mobile station via a first relay station;
means for instructing the mobile station to broadcast a random access burst for receipt by a plurality of relay stations;
means for receiving, from each of one or more relay stations, information indicative of a quality of reception of the random access burst from the mobile station;
means for using the information from each of the one or more relay stations as a basis for selecting one of the one or more relay stations; and
means for, if the selected relay station is not the first relay station, providing the mobile station with instructions that will cause the mobile station to communicate indirectly with the base station via the selected relay station.

20. The apparatus of claim 19, wherein the instructions that will cause the mobile station to communicate indirectly with the base station via the selected relay station identify a physical channel to be used by the mobile station.

* * * * *

UNITED STATES PATENT AND TRADEMARK OFFICE
CERTIFICATE OF CORRECTION

| | |
|---|---|
| PATENT NO. | : 7,813,695 B2 |
| APPLICATION NO. | : 11/123046 |
| DATED | : October 12, 2010 |
| INVENTOR(S) | : Haartsen |

It is certified that error appears in the above-identified patent and that said Letters Patent is hereby corrected as shown below:

On the Face Page, in Field (58), under "Field of Classification Search", in Column 1, Line 7, after "252," delete "318. 338, 342.347,".

On Page 2, in Field (56), under "OTHER PUBLICATIONS", Column 2, Line 2, delete "2000" and insert -- 2000, --, therefor.

On Page 2, in Field (56), under "OTHER PUBLICATIONS", in Column 2, Line 3, delete "Tokoyo," and insert -- Tokyo, --, therefor.

On Page 2, in Field (56), under "OTHER PUBLICATIONS", in Column 2, Line 10, delete "6250E" and insert -- 6250F --, therefor.

On Page 2, in Field (56), under "OTHER PUBLICATIONS", in Column 2, Line 12, delete "1669-1677" and insert -- 1669-1677, --, therefor.

On Page 2, in Field (56), under "OTHER PUBLICATIONS", in Column 2, Line 14, delete "6250E" and insert -- 6250F --, therefor.

In Column 9, Line 43, in Claim 11, delete "using," and insert -- using --, therefor.

Signed and Sealed this
Sixteenth Day of August, 2011

David J. Kappos
*Director of the United States Patent and Trademark Office*